Figure 1:
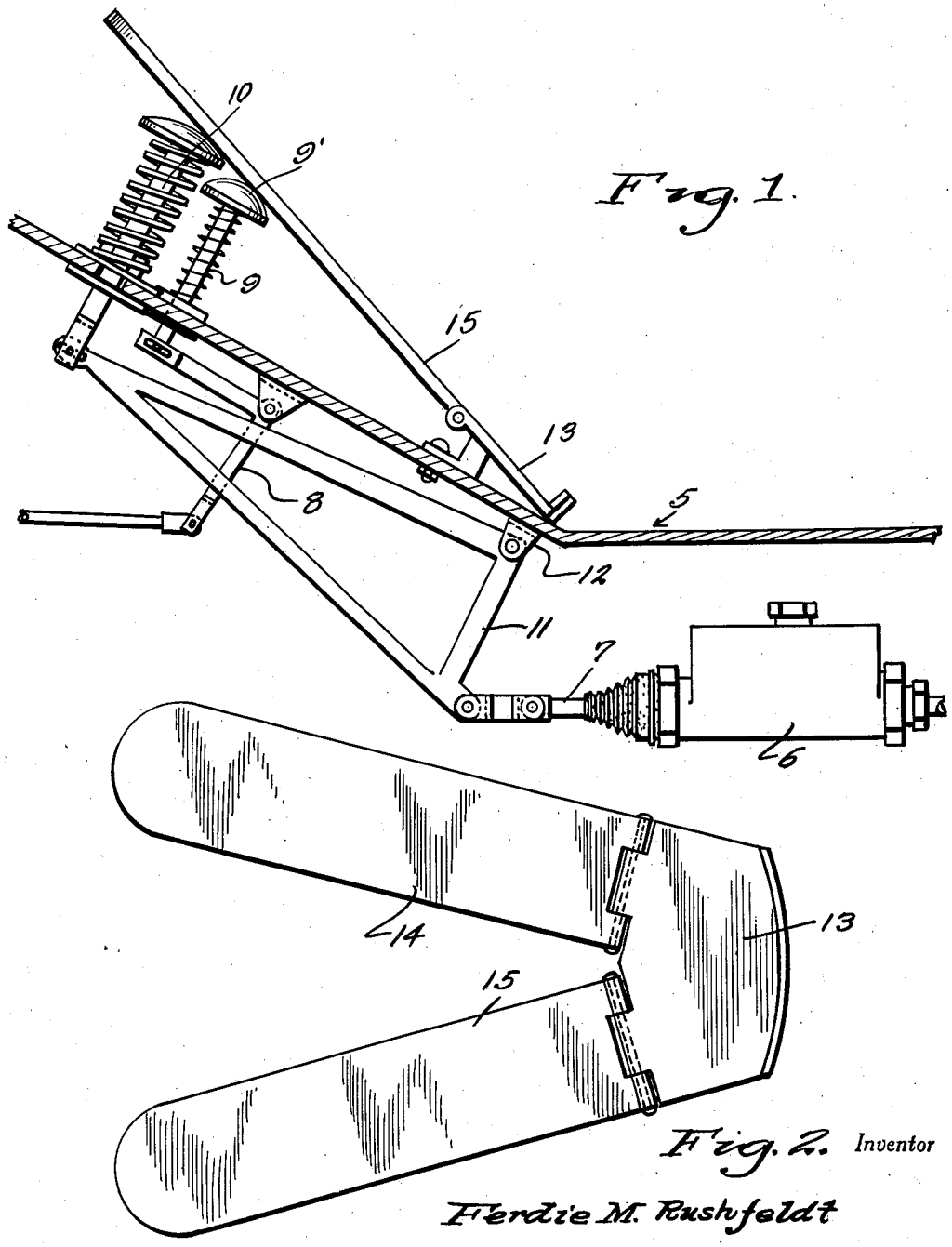

May 13, 1941.　　F. M. RUSHFELDT　　2,242,145

COMBINATION BRAKE AND ACCELERATOR PEDAL

Filed April 16, 1940

Fig. 2.　Inventor

Ferdie M. Rushfeldt

By Clarence A. O'Brien

Attorney

Patented May 13, 1941

2,242,145

UNITED STATES PATENT OFFICE 2,242,145

COMBINATION BRAKE AND ACCELERATOR PEDAL

Ferdie M. Rushfeldt, Grand Forks, N. Dak., assignor of one-half to William G. Lathrop, Grand Forks, N. Dak.

Application April 16, 1940, Serial No. 329,967

1 Claim. (Cl. 74—512)

This invention relates to a combination brake and accelerator pedal especially adapted to simplify and render the control of a motor vehicle easier, safer and less tiring on the driver.

The primary object of the invention is the provision of a device of the above stated character which includes a heel rest and a pair of treadles pivoted thereto, one for operating the accelerator mechanism of the motor vehicle and the other for operating the brake mechanism of said vehicle by one foot of the driver, the heel of the foot being supported at all times by the heel rest and on which the foot may pivot when moving from one treadle to the other and thereby obviate the driver having to lift the foot from one treadle to the other and which permits a much quicker actuation of either the brake mechanism or the accelerator mechanism by the operator.

With these and other objects in view, as will become apparent as the description proceeds, the invention consists in certain novel features of construction, combination and arrangement of parts to be hereinafter more fully described and claimed.

For a complete understanding of my invention, reference is to be had to the following description and accompanying drawing, in which Figure 1 is a side elevation, broadly in section, illustrating a combination brake and accelerator pedal for motor vehicles constructed in accordance with my invention.

Figure 2 is a top plan view illustrating the pedal.

Referring in detail to the drawing, the numeral 5 indicates the floor board of a motor vehicle, 6 the master cylinder of a hydraulic brake mechanism of said vehicle, the stem of the master piston being indicated by the character 7. The linkage of the accelerator mechanism of the motor vehicle is indicated by the character 8 and includes a spring influenced plunger 9 slidably mounted in the floor board 5 of the motor vehicle and which has a pivotal and slidable connection with the bell crank lever forming a part of the linkage 8. The plunger 9 further includes a head 9'.

A plunger 10 similar in construction to the plunger 9 is also slidably mounted in the floor board 5 of the motor vehicle and is located at a selected spaced distance from the plunger 9 and has a pivotal and slidable connection with a bell crank lever 11.

The bell crank lever is of substantially triangular shape, the apex of which is pivotally connected to the plunger 10 as specified. Another corner of the bell crank lever 11 is pivoted to a bracket 12 mounted on the floor board and the other corner of the bell crank lever is pivotally connected to the stem 7 of the master piston of the hydraulic brake mechanism.

A heel rest 13 is mounted on the floor board 5 at a selected inclination and has hinged thereto diverging treadles 14 and 15. The treadle 15 rests upon the plunger 10 while the treadle 14 rests upon the plunger 9. Pressure placed on the treadle 14 operates the accelerator mechanism to increase the speed of the motor vehicle. Pressure placed on the treadle 15 applies the hydraulic brake mechanism for retarding the speed of the motor vehicle. Therefore, it will be seen that the driver resting the heel of one foot on the heel rest 13 may readily pivot the foot to engage with either of the treadles without lifting the foot or heel off of the heel rest. The movement of the foot from one treadle to another can thus be quickly and easily carried out, consequently simplifying the control of the motor vehicle and permitting the control of the vehicle to be rapidly brought about either in the increased speed of the vehicle or the retarding of the speed of the vehicle.

While I have shown and described the preferred embodiment of my invention, it will be understood that minor changes in construction, combination and arrangement of parts may be made without departing from the spirit and scope of the invention as claimed.

Having thus described the invention, what I claim is:

In a device of the character described, a pair of rods slidably mounted through openings in floor boards of an automobile and arranged adjacent to each other, heads formed on the upper ends of said rods and provided with rounded faces, coil springs mounted on said rods and bearing against the heads and the floor boards to yieldably support the rods, means for connecting one of said rods to an accelerator mechanism of the automobile, a triangular shaped bell crank pivotally and slidably connected to the other rod and pivoted to a brake mechanism of the automobile and pivotally mounted on the floor boards of said automobile, a heel plate mounted on the floor boards, and diverging treadles hinged on the heel plate and resting on the rounded faces of the heads.

FERDIE M. RUSHFELDT.